(12) United States Patent
Chung

(10) Patent No.: US 8,446,028 B2
(45) Date of Patent: May 21, 2013

(54) APPARATUS FOR GENERATING ELECTRIC POWER USING WIND ENERGY

(75) Inventor: Chun-Neng Chung, Pingtung County (TW)

(73) Assignee: Fung Gin Da Energy Science and Technology Co., Ltd., Pingtung County (TW)

( * ) Notice: Subject to any disclaimer, the term of this patent is extended or adjusted under 35 U.S.C. 154(b) by 460 days.

(21) Appl. No.: 12/729,230

(22) Filed: Mar. 22, 2010

(65) Prior Publication Data

US 2011/0133471 A1 Jun. 9, 2011

(30) Foreign Application Priority Data

Dec. 4, 2009 (TW) .............................. 98141529 A

(51) Int. Cl.
*F03D 9/00* (2006.01)
(52) U.S. Cl.
USPC .............................................. 290/44; 290/55
(58) Field of Classification Search
USPC ...... 290/44, 55; 415/4.2, 3.1, 906; 416/236 R
See application file for complete search history.

(56) References Cited

U.S. PATENT DOCUMENTS

| 2,265,788 | A | * | 12/1941 | Wolf, Sr. et al. | .......... | 416/236 R |
| 4,650,403 | A | | 3/1987 | Takacs | ...................... | 416/197 A |
| 6,406,264 | B1 | * | 6/2002 | Paulus | ...................... | 416/236 R |
| 7,056,082 | B1 | | 6/2006 | Taylor | ........................... | 415/4.2 |
| 7,605,491 | B1 | | 10/2009 | Chung | ............................. | 290/55 |
| 7,969,036 | B2 | * | 6/2011 | Chung | ............................. | 290/55 |
| 2008/0273977 | A1 | * | 11/2008 | Beard | ........................... | 416/176 |

FOREIGN PATENT DOCUMENTS

| CN | 101555866 A | 10/2009 |
| CN | 101566124 A | 10/2009 |
| EP | 2123904 A1 | 11/2009 |
| EP | 2423500 A1 | 2/2012 |
| RU | 2120564 C1 | 10/1998 |
| TW | 200936879 A | 9/2009 |
| TW | 200940828 A | 10/2009 |

OTHER PUBLICATIONS

Search Report for related EPO patent application No. 10157207.1 mailed on Jul. 18, 2012.
Search report for related Taiwanese application No. 98141529, issued on Oct. 19, 2012 and its English.

* cited by examiner

*Primary Examiner* — Tho D Ta
(74) *Attorney, Agent, or Firm* — Ladas & Parry LLP

(57) ABSTRACT

An apparatus for generating electric power from wind energy includes a blade device rotatable relative to a base to convert wind energy into a mechanical rotary power output, and having an upright rod connected with upright blades and coupled to a generator in the base to convert the mechanical rotary power output into electric power. Each blade has spaced wind-collecting ribs extending vertically from a first side surface thereof, thereby defining a wind-collecting space between any two adjacent wind-collecting ribs. A wind-collecting unit includes upright plates mounted on the base, angularly equidistant and disposed around the blade device. Any two adjacent plates define an inwardly converging wind-guiding channel therebetween. The plates are non-flat so that wind is guided by the plates to blow onto the first side surfaces of the blades via the wind-guiding channels.

14 Claims, 17 Drawing Sheets

US 8,446,028 B2

APPARATUS FOR GENERATING ELECTRIC POWER USING WIND ENERGY

CROSS-REFERENCE TO RELATED APPLICATION

This application claims priority of Taiwanese Application No. 098141529, filed on Dec. 4, 2009.

BACKGROUND OF THE INVENTION

1. Field of the Invention

The invention relates to an apparatus for generating electric power from wind energy.

2. Description of the Related Art

Referring to FIG. 1, a conventional apparatus 1 for generating electric power from wind energy is shown to include a windmill 12 and a generator 13. The windmill 12 includes an upright prop 121 mounted fixedly on a supporting surface (not shown), and a wind impeller 122 having a plurality of blades. The windmill 12 converts wind energy into a mechanical rotary power output. The generator 13 is coupled to the windmill 12 to convert the mechanical rotary power into electric power.

The following are some of the drawbacks of the conventional apparatus 1:

1. A height of the prop 121 of the windmill 12 is about 70 meters, and a length of each blade of the wind impeller 122 of the windmill 12 is about 35 meters, thereby resulting in a relatively large space requirement. Therefore, the conventional apparatus 1 has to be located at a remote place far from a densely populated area, thereby resulting in inconvenience during implementation.

2. The arrangement of the conventional apparatus 1 cannot ensure stable electric generation for an area having wind from various directions.

To overcome the drawbacks of the aforesaid conventional apparatus 1, there was proposed another conventional apparatus 2 for generating electric power from wind energy shown in FIG. 2. Referring further to FIGS. 3 and 4, the apparatus 2 includes a blade unit 23 having upright blades 231 connected directly and fixedly to an upright rod 232 that has a lower end disposed pivotally in a base 21 such that the blade unit 23 is rotatable relative to the base 21 to convert wind energy into a mechanical rotary power output, and coupled to a generator 22 in the base 21 to convert the mechanical rotary power output into electric power. Each blade 231 has opposite first and second side surfaces 2311, 2312. The first side surface 2311 of each blade 231 faces the second side surface 2312 of an adjacent blade 231. A wind-collecting unit 24 includes upright plates 241 fixed on the base 21, angularly equidistant and disposed around the blade unit 23. Any two adjacent plates 241 define an inwardly converging wind-guiding channel 240 therebetween (see FIG. 4). The plates 241 are non-flat so that wind is guided by the plates 241 to blow onto the first side surfaces 2311 of the blades 231 via the wind-guiding channels 240.

Due to the presence of the wind-collecting unit 24, wind from different directions can be guided by the upright plates 241 to blow onto the first side surfaces 2311 of the blades 231 of the blade unit 23 via the wind-guiding channels 240. Thus, the apparatus 2 can provide stable electric generation even though the wind direction changes.

Therefore, it is desired to design an apparatus for generating electric power using wind energy with stable and enhanced electric generation efficiency.

SUMMARY OF THE INVENTION

Therefore, an object of the present invention is to provide an apparatus for generating electric power using wind energy that can enhance stable electric generation efficiency.

According to the present invention, there is provided an apparatus for generating electric power from wind energy. The apparatus comprises:

a base;

a blade device including an upright rod extending vertically along a pivot axis and having a lower end disposed pivotally in the base, and an upper end, and at least one blade unit having a plurality of upright blades connected directly and fixedly to the upright rod such that the blade device is rotatable relative to the base about the pivot axis so as to convert wind energy into a mechanical rotary power output, each of the blades of the blade unit having opposite first and second side surfaces, and a plurality of first wind-collecting ribs extending vertically from the first side surface, spaced apart from each other such that a wind-collecting space is defined between any two adjacent ones of the first wind-collecting ribs, and having a thickness that increases gradually toward the first side surface, the first side surface of each of the blades of the blade unit facing the second side surface of an adjacent one of the blades;

a generator disposed in the base and coupled to the lower end of the upright rod of the blade device to convert the mechanical rotary power output into electric power; and a wind-collecting unit mounted on the base, and including a plurality of upright plates angularly equidistant and disposed around the blade device, any two adjacent ones of the upright plates defining an inwardly converging wind-guiding channel therebetween.

The upright plates of the wind-collecting unit are non-flat so that wind is guided by the upright plates of the wind-collecting unit to blow onto the first side surfaces of the blades of the blade unit of the blade device via the wind-guiding channels in the wind-collecting unit.

BRIEF DESCRIPTION OF THE DRAWINGS

Other features and advantages of the present invent ion will become apparent in the following detailed description of the preferred embodiments with reference to the accompanying drawings, of which.

DETAILED DESCRIPTION OF THE PREFERRED EMBODIMENTS

Figure 1:
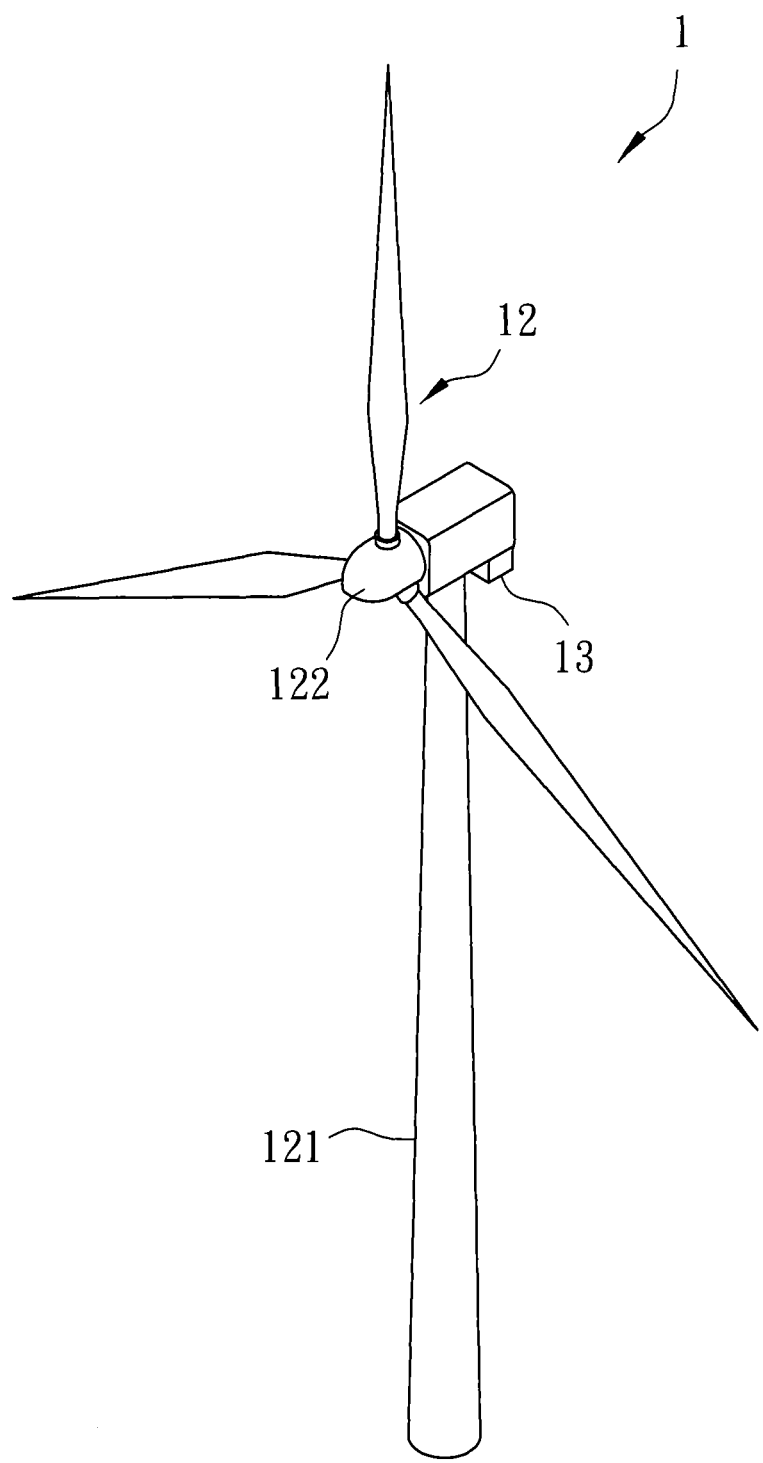
FIG. 1 is a perspective view of a conventional apparatus for generating electric power using wind energy.
Figure 2:
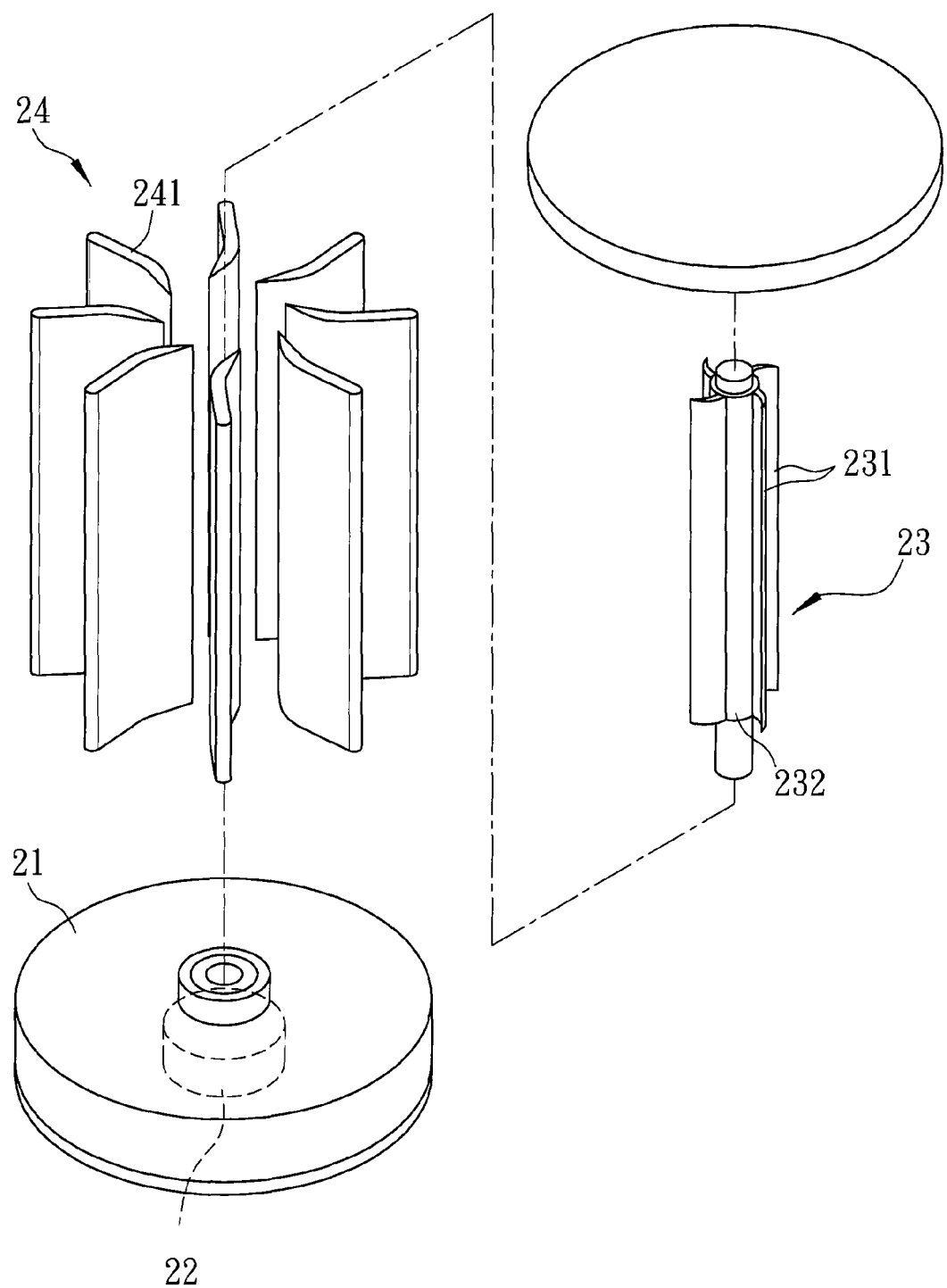
FIG. 2 is a partly exploded perspective view showing another conventional apparatus for generating electric power using wind energy.
Figure 3:
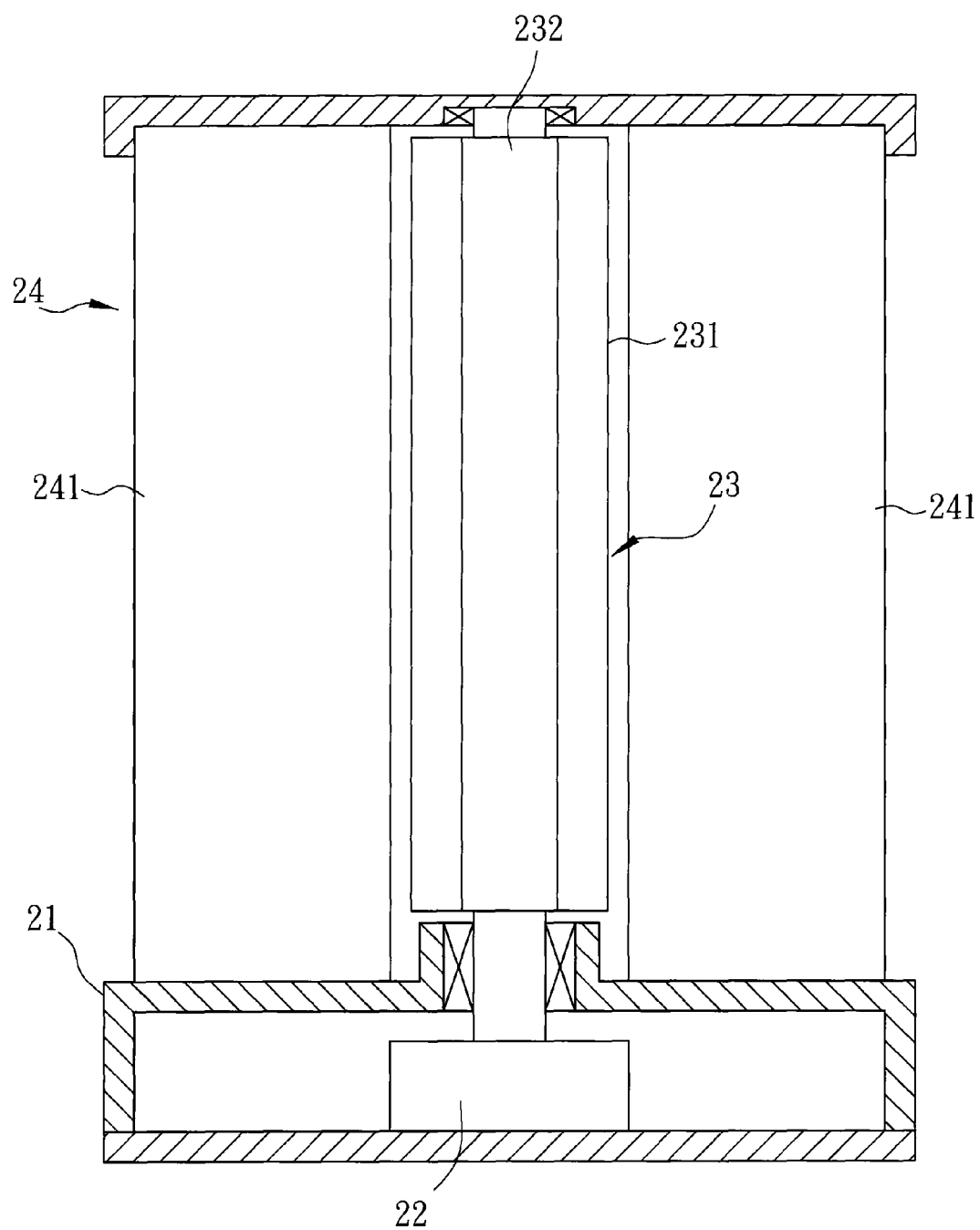
FIG. 3 is a schematic sectional view showing the conventional apparatus of FIG. 2.
Figure 4:
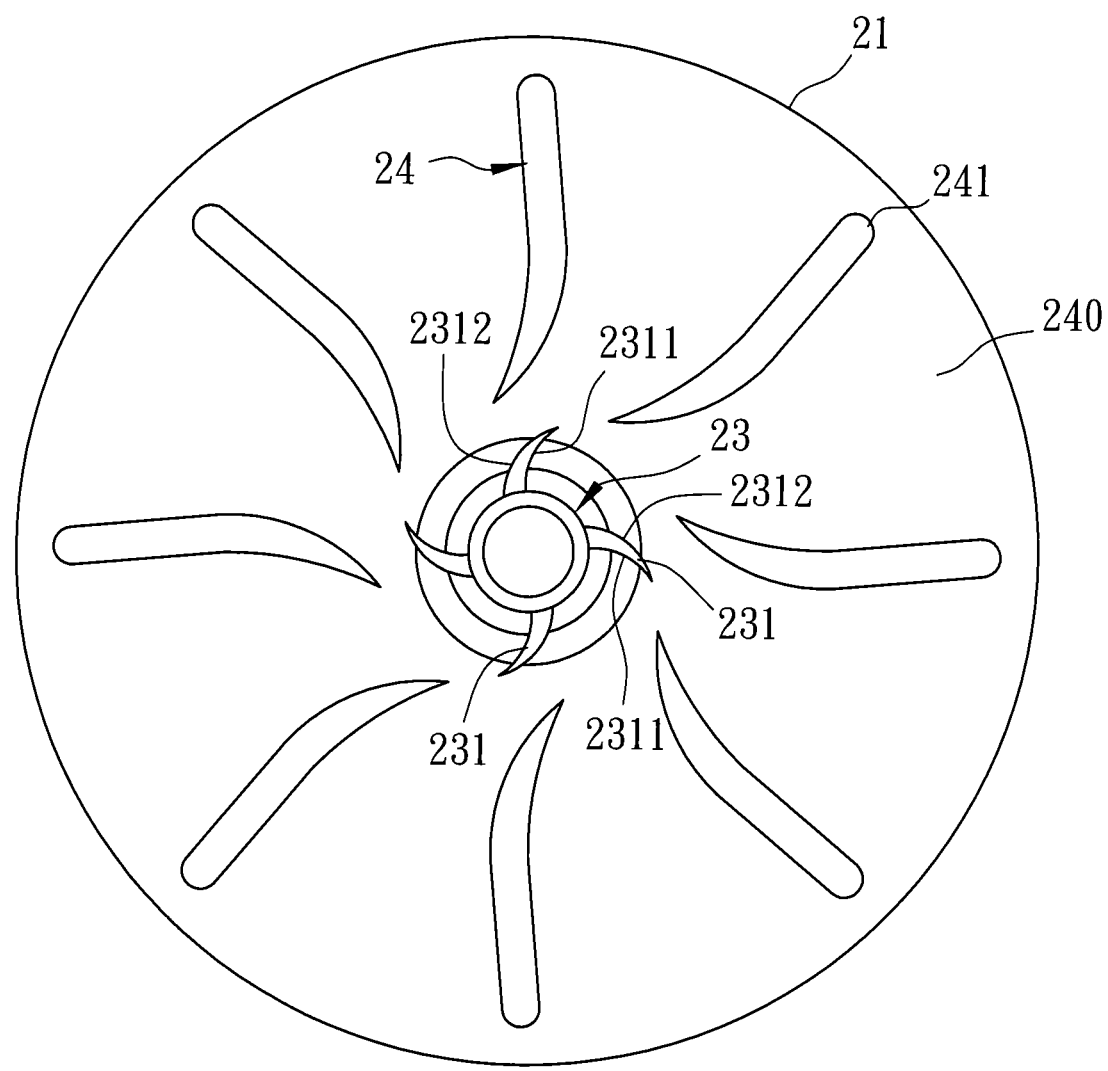
FIG. 4 is a schematic top view showing the conventional apparatus of FIG. 2 without a top wall.
Figure 5:
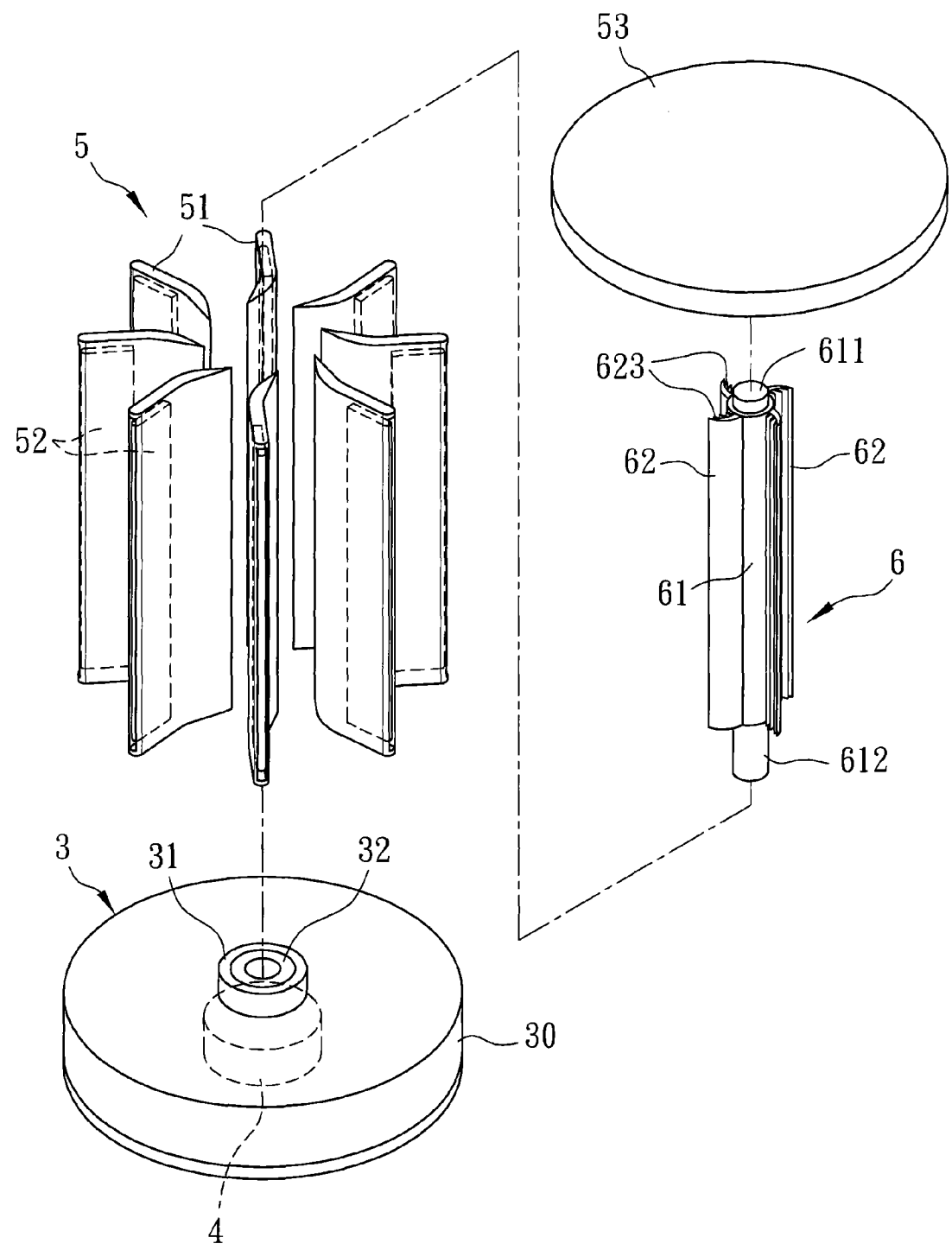
FIG. 5 is a partly exploded perspective view showing the first preferred embodiment of an apparatus for generating electric power using wind energy according to the present invention.

Before the present invention is described in greater detail, it should be noted that like elements are denoted by the same reference numerals throughout the disclosure.

Referring to FIGS. 5 to 8, the first preferred embodiment of an apparatus for generating electric power using wind energy according to the present invention is shown to include a base 3, a blade device 6, a generator 4, a wind collecting unit 5, a plurality of driving units 8, and a control unit 7.

In this embodiment, the base 3 includes a circular base body 30, a mounting tube 31 extending upwardly from a top side of the base body 30, and a bearing 32 disposed in the mounting tube 31.

Figure 6:
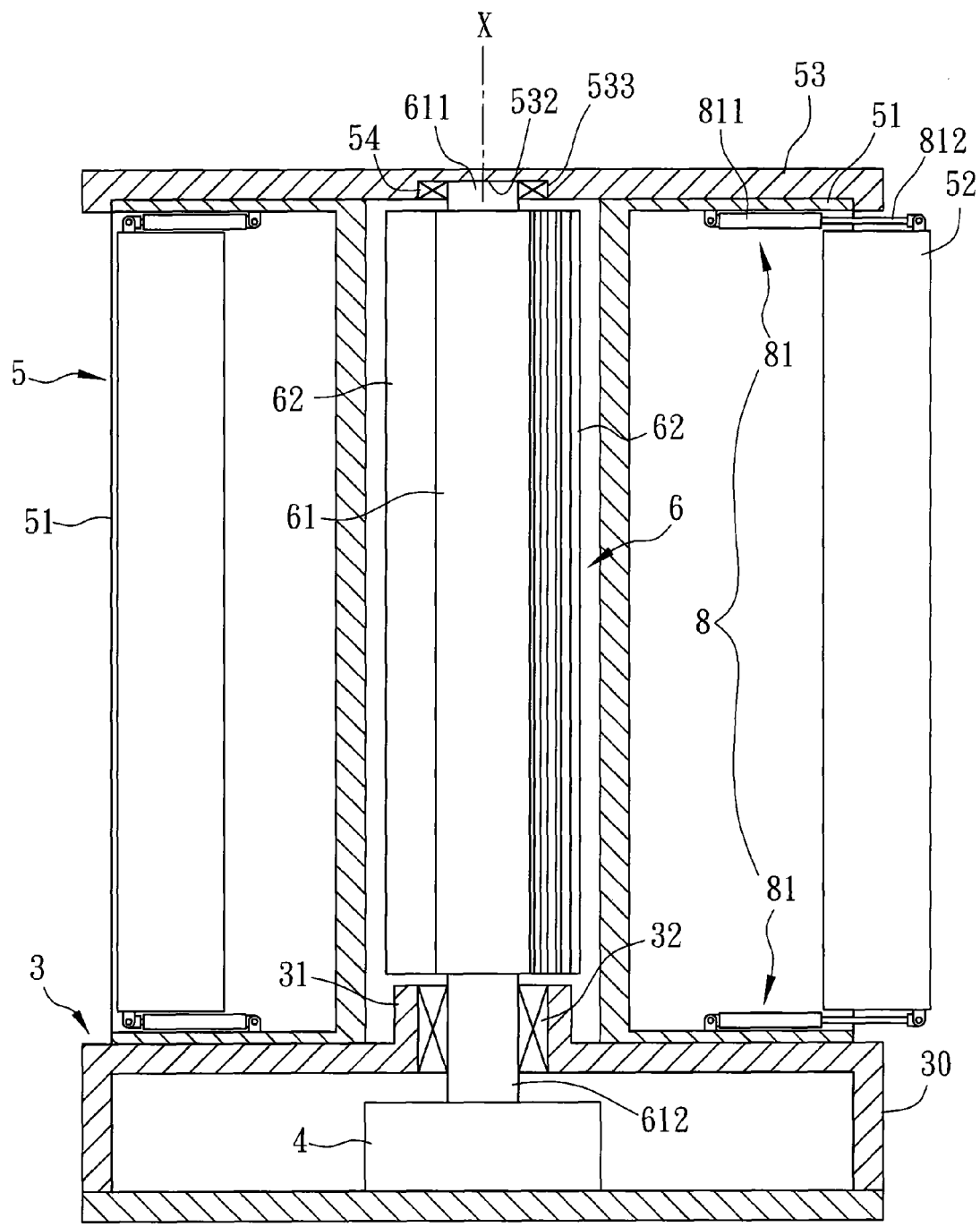
FIG. 6 is a schematic sectional view showing the first preferred embodiment.
Figure 7:
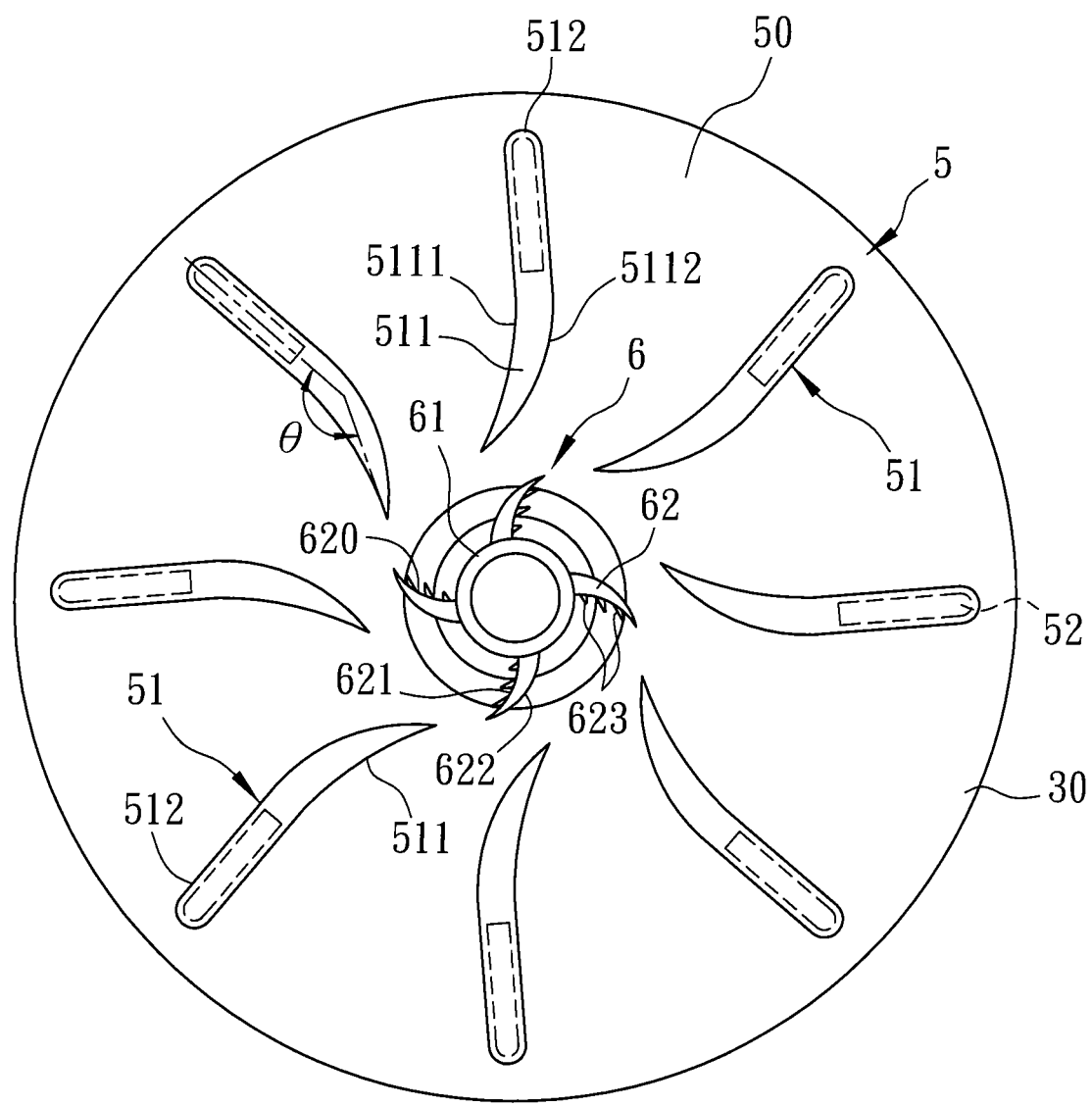
FIG. 7 is a schematic top view showing the first preferred embodiment without a top wall.
Figure 8:
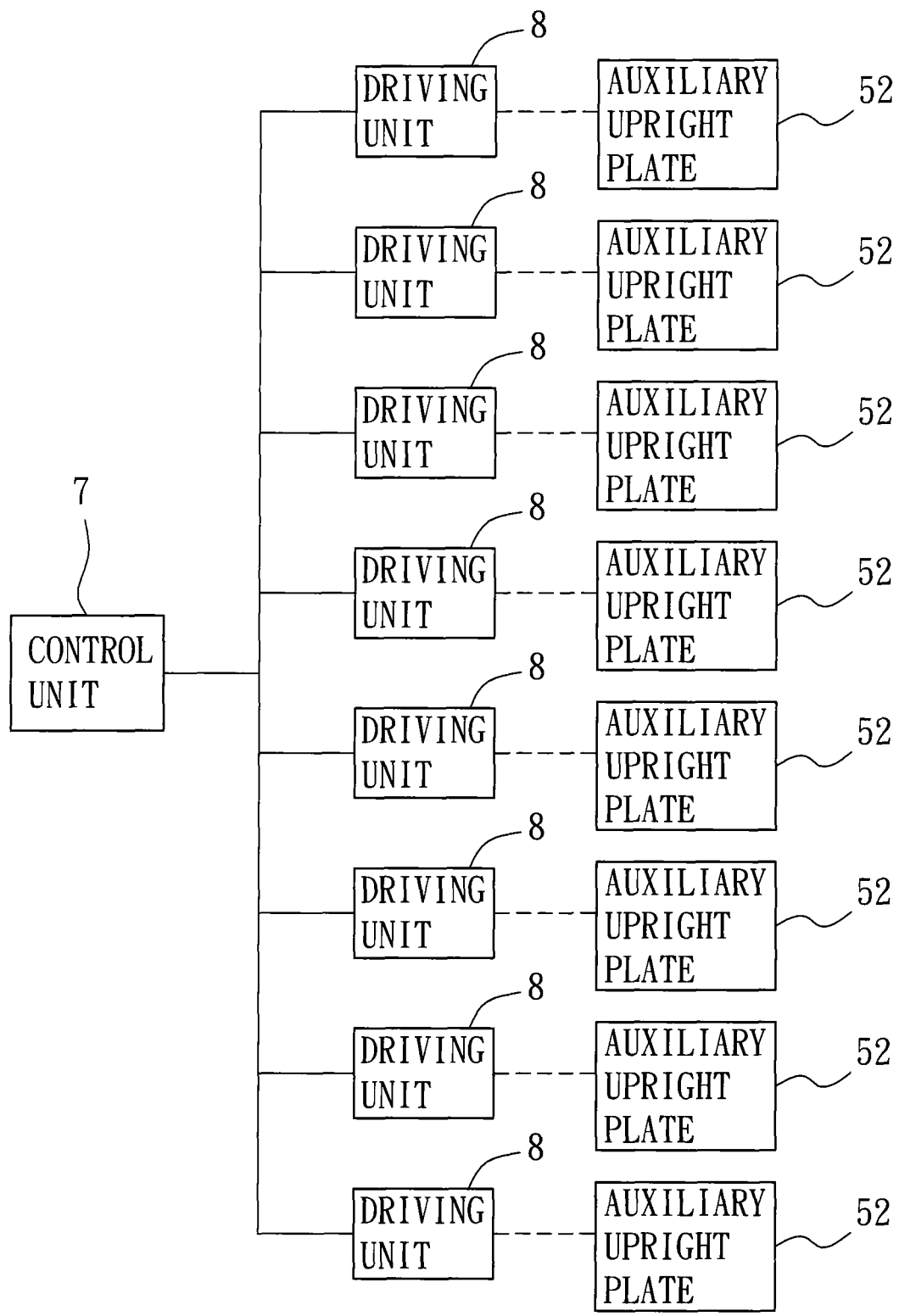
FIG. 8 is a schematic circuit block diagram illustrating a control unit and driving units of the first preferred embodiment.

The blade device 6 includes an upright rod 61 extending vertically along a pivot axis (X) and having a lower end 612 disposed pivotally in the base 3 and extending through the mounting tube 31 and into the base body 30, and a blade unit, which has a plurality of upright blades 62 connected directly and fixedly to the upright rod 61, such that the blade device 6 is rotatable relative to the base 3 about the pivot axis (X) so as to convert wind energy into a mechanical rotary power output. The bearing 32 is disposed between an outer annular surface of the lower end 612 of the upright rod 61 and an inner annular surface 311 of the mounting tube 31 of the base 3, as shown in FIG. 6. Each blade 62 has opposite first and second side surfaces 621, 622, and a plurality of first wind-collecting ribs 623 extending vertically from the first side surface 621, spaced apart from each other such that a wind-collecting space 620 is defined between any two adjacent first wind-collecting ribs 623, and having a thickness that increases gradually toward the first side surface 621. The first side surface 621 of each blade 62 faces the second side surface 622 of an adjacent blade 62, as shown in FIG. 7.

Figure 11:
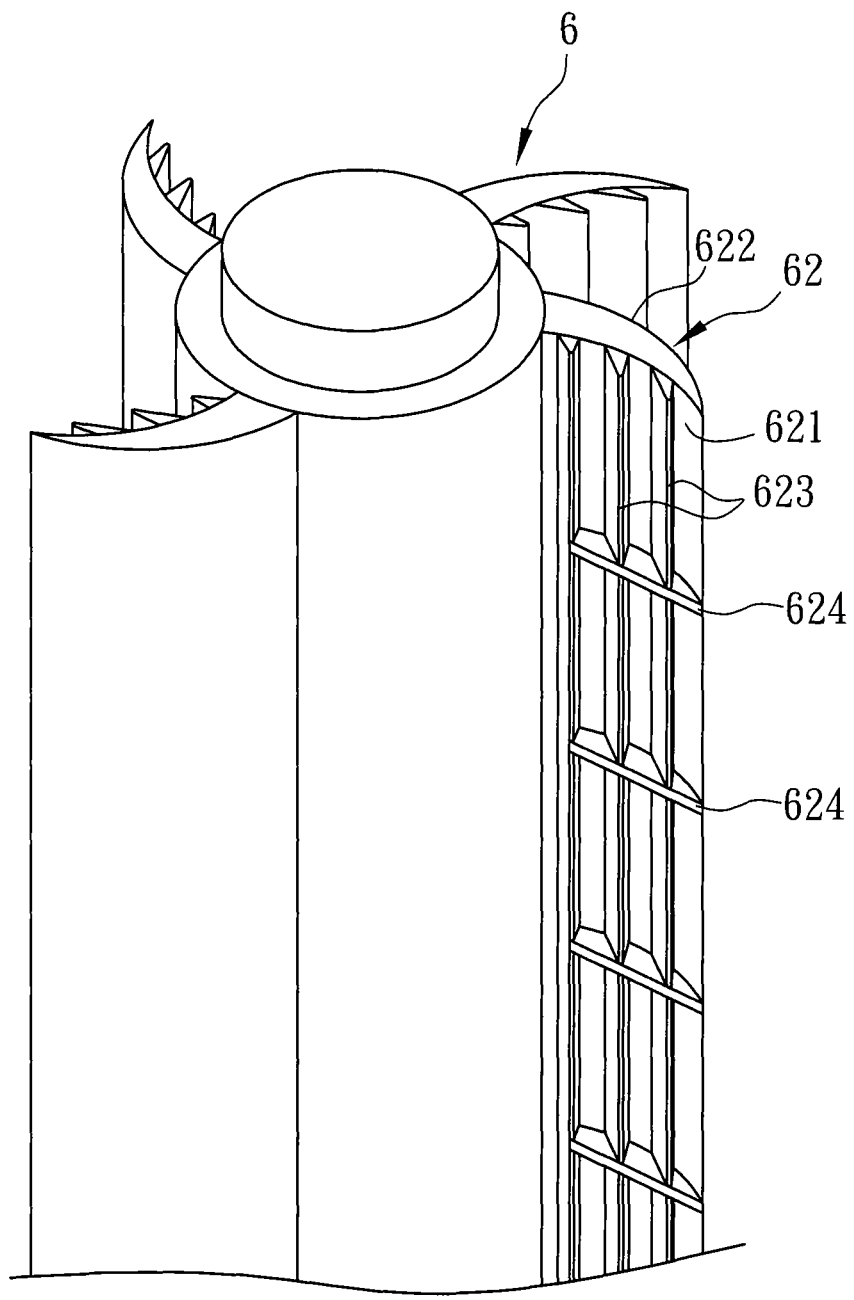
FIG. 11 is a fragmentary perspective view showing a variation of a blade device of the first preferred embodiment.

FIG. 11 illustrates a variation of the blade device 6, wherein each blade 62 of the blade unit further has a plurality of second wind-collecting ribs 624 extending horizontally from the first side surface 621, spaced apart from each other and intersecting the first wind-collecting ribs 623.

The generator 4 is disposed in the base body 30 of the base 3, and is coupled to the lower end 612 of the upright rod 61 of the blade device 6 to convert the mechanical rotary power output into electric power.

The wind collecting unit 5 is mounted on the base 3, and includes a plurality of upright plates 51, a plurality of auxiliary upright plates 52, a top wall 53, and a bearing 54 in this embodiment, as shown in FIG. 6. The upright plates 51 are angularly equidistant and are disposed around the blade device 6, and have bottom ends connected fixedly to the base body 30 of the base 3 in this embodiment. As shown in FIG. 7, any two adjacent ones of the upright plates 51 define an inwardly converging wind-guiding channel 50 therebetween. The upright plates 51 are non-flat so that wind is guided by the upright plates 61 to blow onto the first side surfaces 621 of the blades 62 of the blade unit of the blade device 6 via the wind-guiding channels 50. Each upright plate 51 has a first end portion 511 adjacent to the blade device 6 and extending in a non-radial direction, and a second end portion 512 opposite to the first end portion 511, and is bent so that an obtuse angle (θ) is formed between the first and second end portions 511, 512. The obtuse angle (θ) ranges from 135° to 165°. The first end portion 511 of each upright plate 51 has a thickness that decreases gradually toward the blade device 6. In this embodiment, the first end portion 511 of each upright plate 51 has opposite curved first and second surfaces 5111, 5112. The auxiliary upright plates 52 are disposed movably and respectively in the upright plates 51. Each auxiliary upright plate 52 is movable relative to a corresponding one of the upright plates 51 between a retracted position and an extended position. As a result, when any two adjacent auxiliary upright plates 52 are at the extended position, the wind-collecting channel 50 defined between the corresponding adjacent upright plates 51 is extended. The top wall 53 is mounted on top ends of the upright plates 51, and has a bottom surface formed with a positioning groove 532 that permits extension of the upper end 611 of the upright rod 61 of the blade device 6 thereinto and that is defined by an inner annular surface 533 of the top wall 53. The bearing 54 is disposed between the inner annular surface 533 of the top wall 53 and an outer annular surface of the upper end 611 of the upright rod 61 of the blade device 6.

The driving units 8 drive respectively the auxiliary upright plates 52 of the wind-collecting unit 5 to move between the retracted position and the extended position. In this embodiment, as shown in FIG. 6, each driving unit 8 includes a plurality of fluid cylinders, such as oil cylinders. For each driving unit 8, each fluid cylinder 81 has a cylinder body 811 mounted fixedly in a respective upright plate 51, and a piston rod 812 coupled movably to the cylinder body 811 and connected to a corresponding auxiliary upright plate 52.

Figure 9:
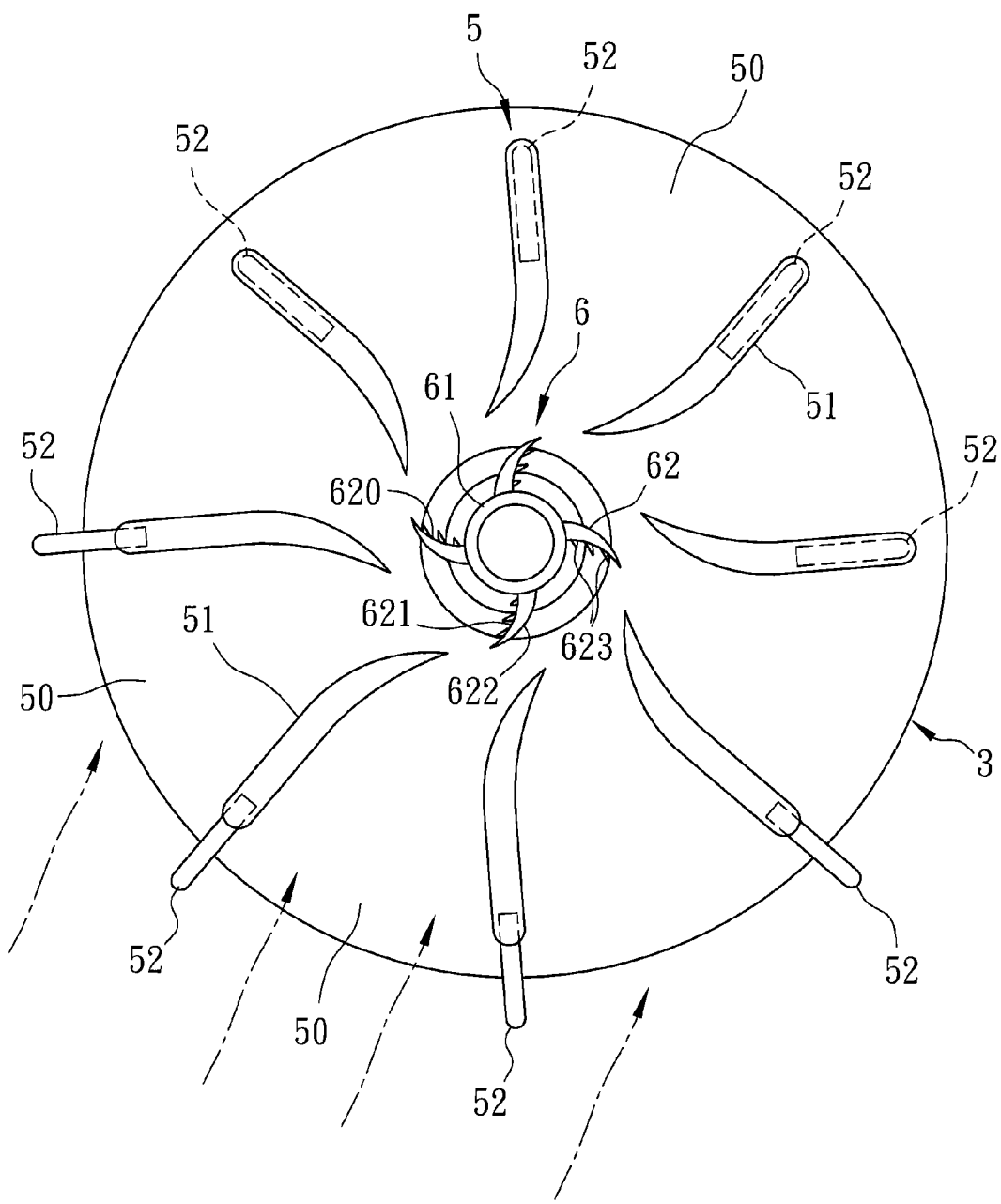
FIG. 9 is a schematic top view showing the first preferred embodiment without the top wall when in a state of use.
Figure 10:
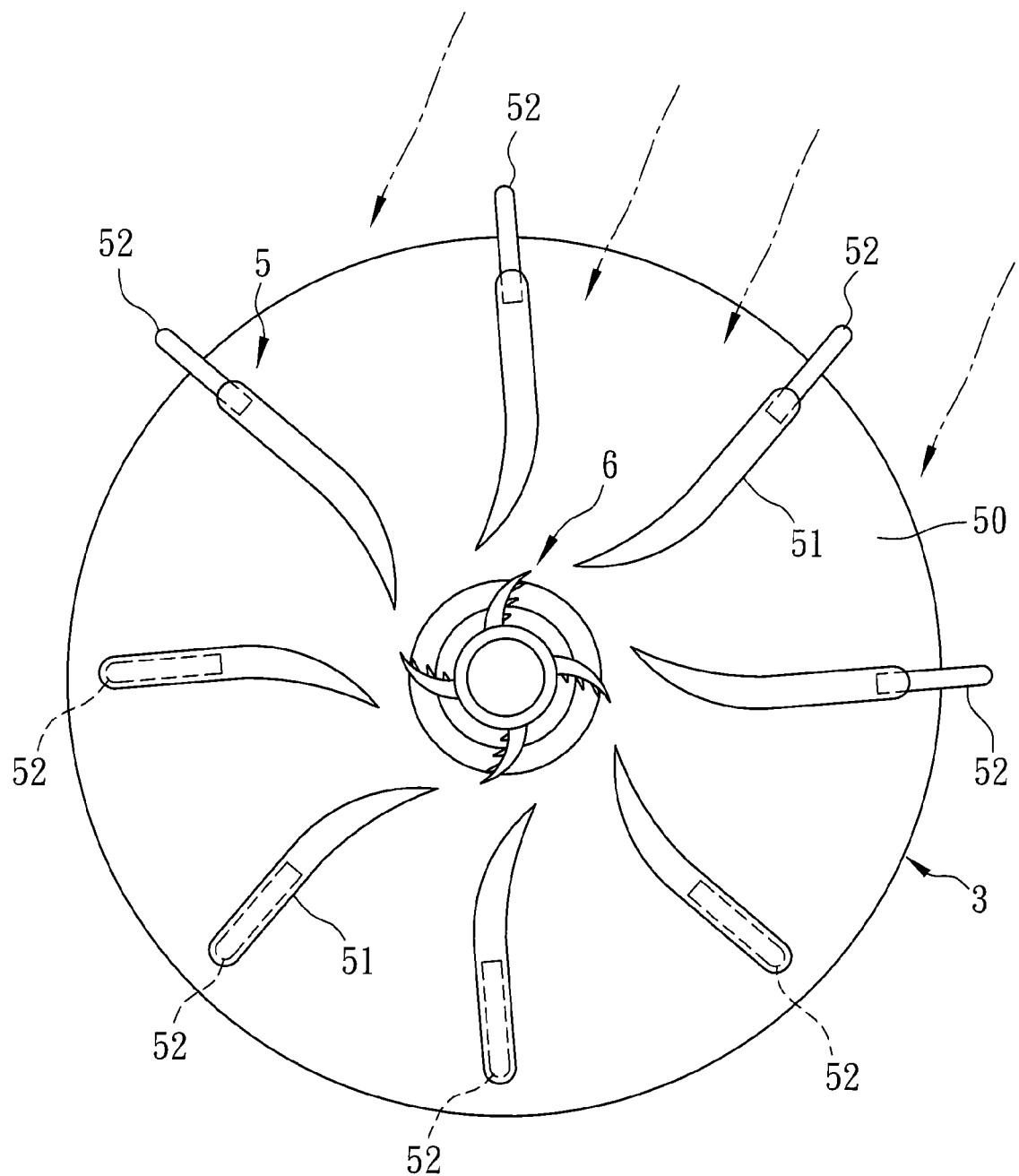
FIG. 10 is a schematic top view showing the first preferred embodiment without the top wall when in another state of use.

The control unit 7 is coupled to the driving units 8, and is operable so as to control operation of each of the driving units 8 based on ambient wind. For example, when ambient wind blows from southwest, as indicated by imaginary arrow lines in FIG. 9, four corresponding auxiliary upright plates 52 are at the extended position and the other auxiliary upright plates 52 are at the retracted position through operation of the driving units 8 by control of the control unit 7. In another example, when ambient wind blows from northeast, as indicated by imaginary arrow lines in FIG. 10, four corresponding auxiliary upright plates 52 are at the extended position and the other auxiliary upright plates 52 are at the retracted position through operation of the driving unit 8 by control of the control unit 7.

In sum, due to the presence of the upright plates and the auxiliary upright plates 52 of the wind-collecting unit 5, and the wind-collecting ribs 623 of each blade 62, wind from different directions can be guided by the upright plates 51 to blow onto the first side surfaces 621 of the blades 62 of the blade device 6 via the extended wind-guiding channels 50, thereby enhancing stable electric generation efficiency even though the wind direction changes.

Figure 12:
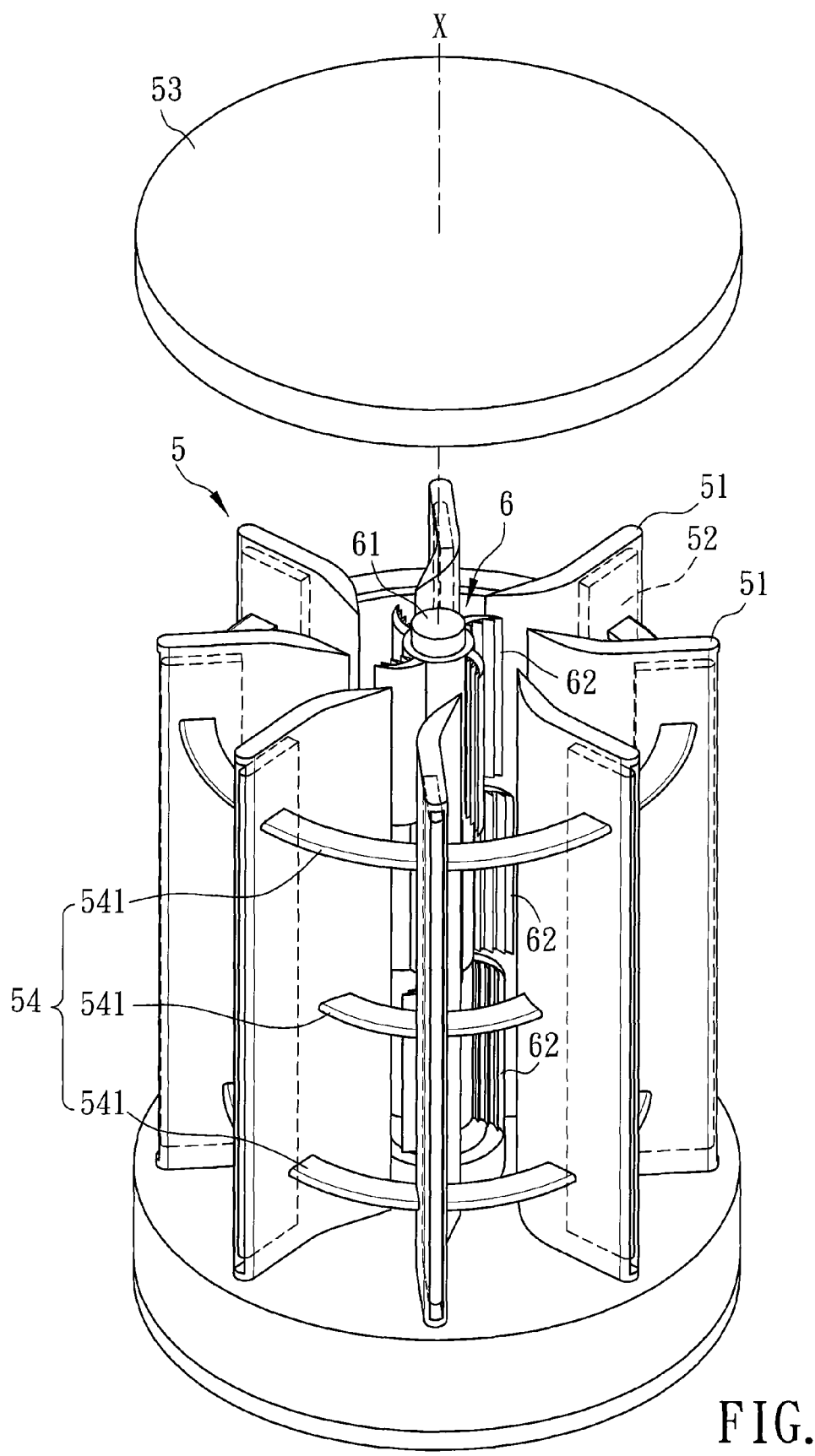
FIG. 12 is a partly exploded perspective view showing the second preferred embodiment of an apparatus for generating electric power using wind energy according to the present invention.

FIG. 12 illustrates the second preferred embodiment of an apparatus for generating electric power using wind energy according to this invention, which is a modification of the first preferred embodiment. When compared to the first preferred embodiment, the blade device 6 includes a plurality of the blade units aligned in the pivot axis (X). The blades 62 of each blade unit are angularly equidistant. The blades 62 of the blade unit differ angularly from each other.

Furthermore, the wind-collecting unit 5 further includes a plurality of connecting units 54, each of which includes a plurality of connecting plates 541 interconnecting between two corresponding adjacent upright plates 51, thereby securely positioning the upright plates 51.

Figure 13:
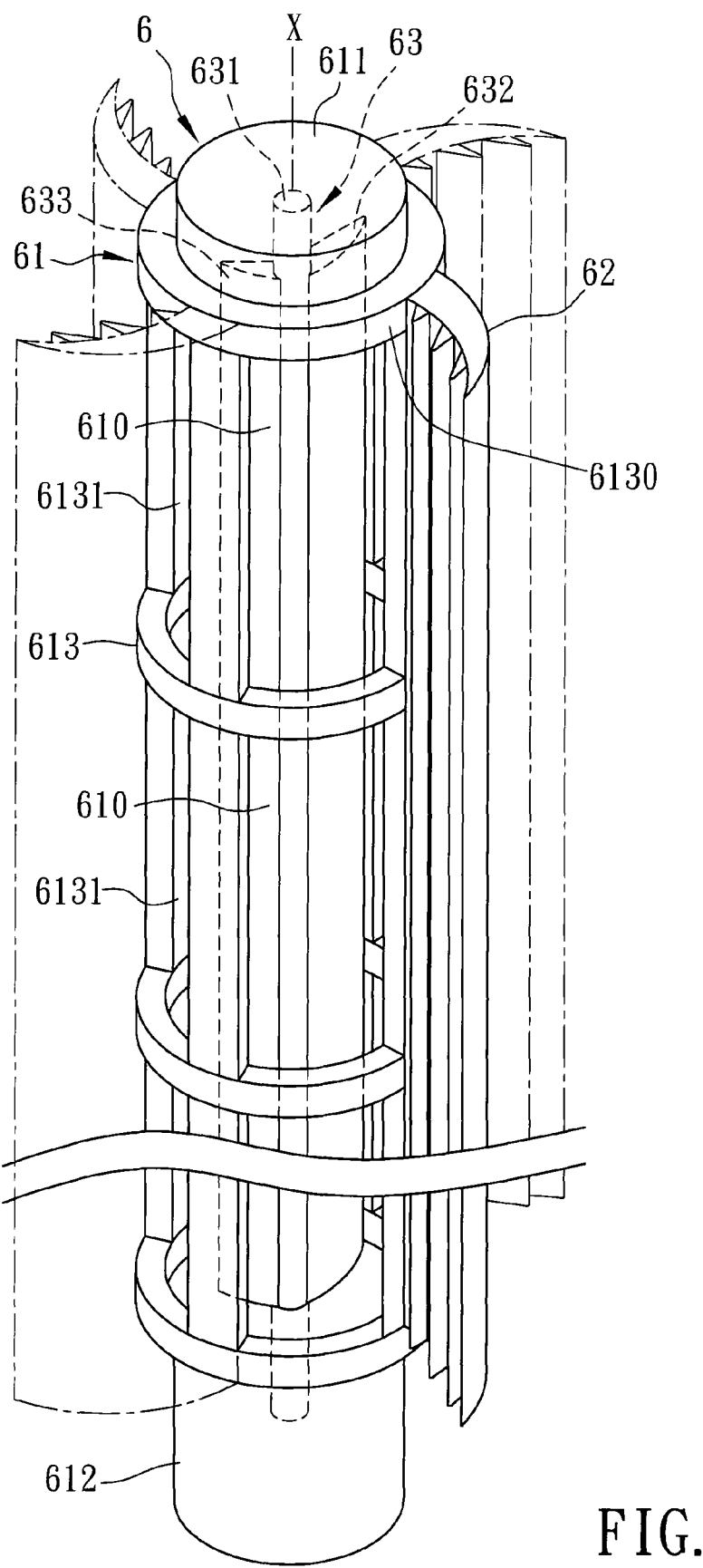
FIG. 13 is a perspective view showing a blade device of the third preferred embodiment of an apparatus for generating electric power using wind energy according to the present invention.
Figure 14:
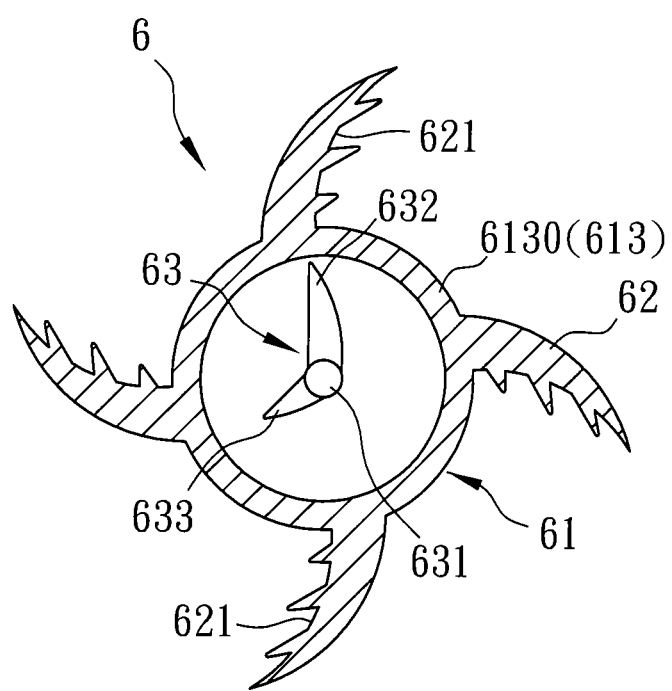
FIG. 14 is a partly schematic sectional view showing the blade device of the third preferred embodiment.

FIGS. 13 and 14 illustrate the blade device 6 of the third preferred embodiment of an apparatus 2 for generating electric power using wind energy according to this invention, which is a modification of the first preferred embodiment. When compared to the first preferred embodiment, the upright rod 61 of the blade device 6 further has a tubular intermediate portion 613 interconnecting the upper and lower ends 611, 612 and having an annular wall 6139 that is connected with the blades 62 of the blade unit and is formed with a plurality of openings 6131. Furthermore, the blade device 6 further includes a wind-guiding unit 63 disposed in the intermediate portion 613 of the upright rod 61 for guiding wind flowing into the intermediate portion 613 of the upright rod 61 via the openings 6131 to blow toward the first side surfaces 621 of the blades 62 of the blade unit.

In this embodiment, the wind-guiding unit 63 includes an axial rod 631, and upright first and second wind-guiding plates 632, 633. The axial rod 631 extends along the pivot axis (X), and has opposite ends connected pivotally and respectively to the upper and lower ends 611, 612 of the upright rod 61. The first and second wind-guiding plates 632, 633 extend radially from the axial rod 631 such that an obtuse angle is formed between the first and second wind-guiding plates 632, 633 in this embodiment, as shown in FIG. 14. The first wind-guiding plate 632 has a width larger than that of the second wind-guiding plate 633.

Figure 15:
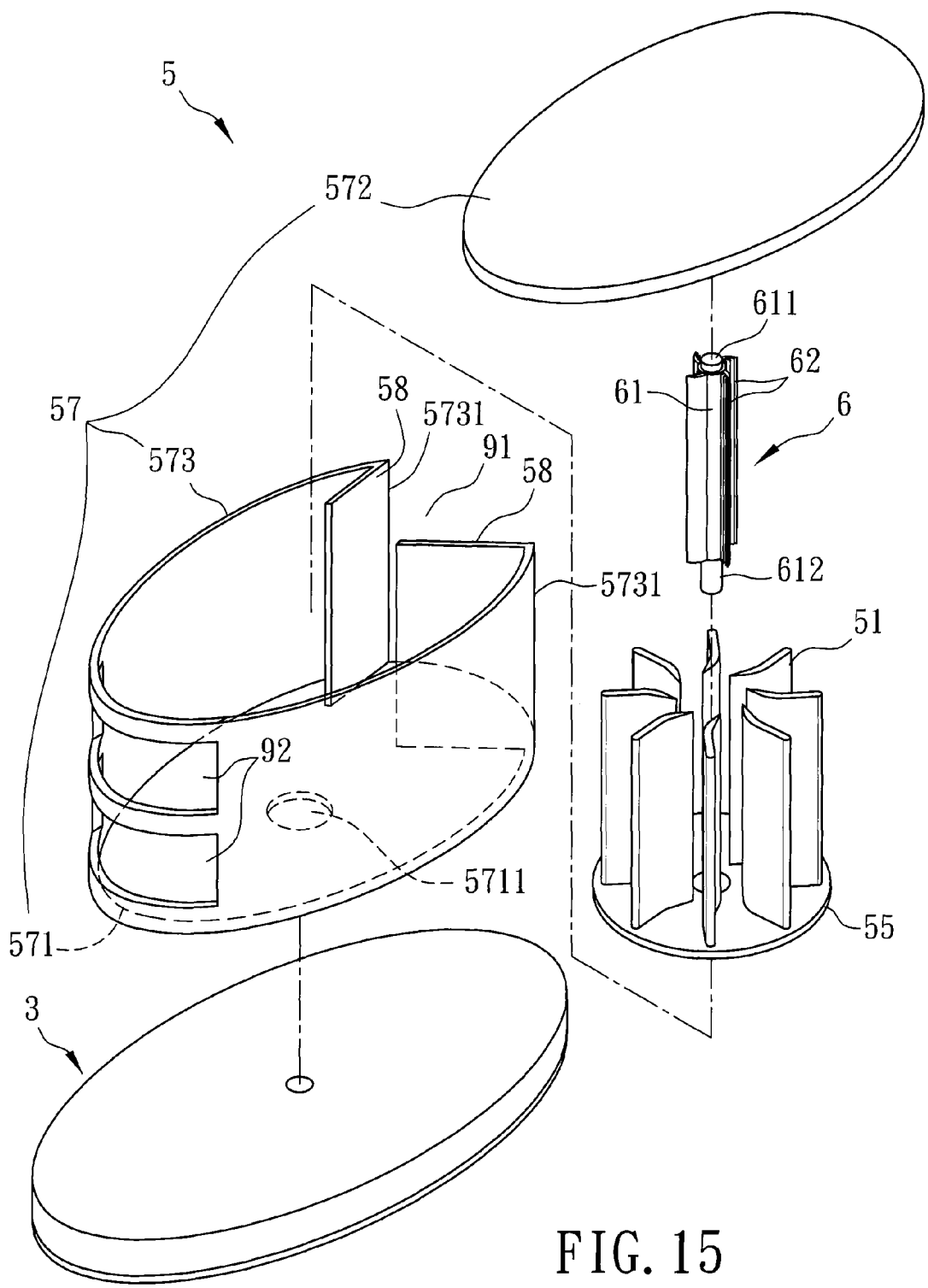
FIG. 15 is a partly exploded perspective view showing the fourth preferred embodiment of an apparatus for generating electric power using wind energy according to the present invention.
Figure 16:
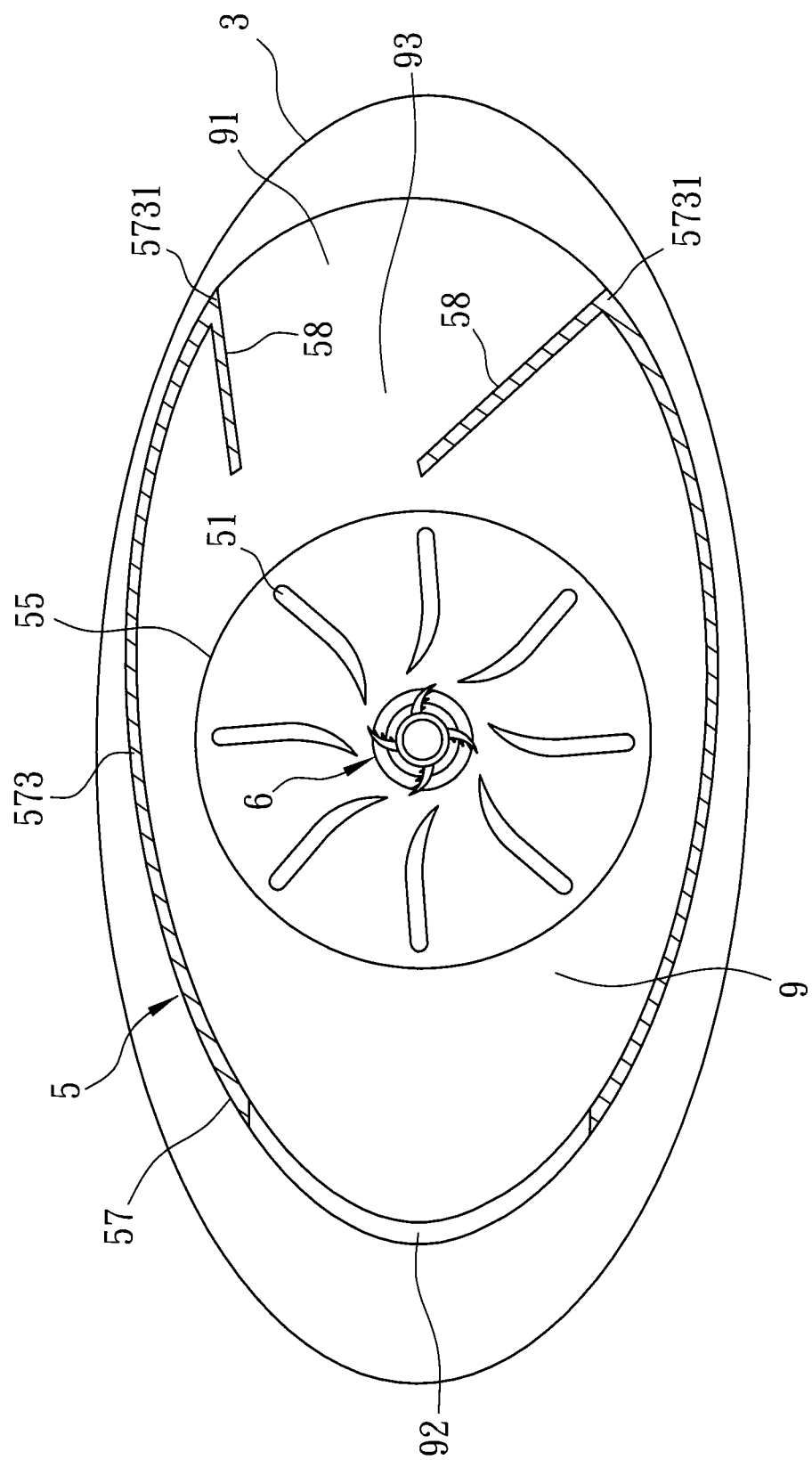
FIG. 16 is a partly sectional, schematic top view showing the fourth preferred embodiment without a top wall.
Figure 17:
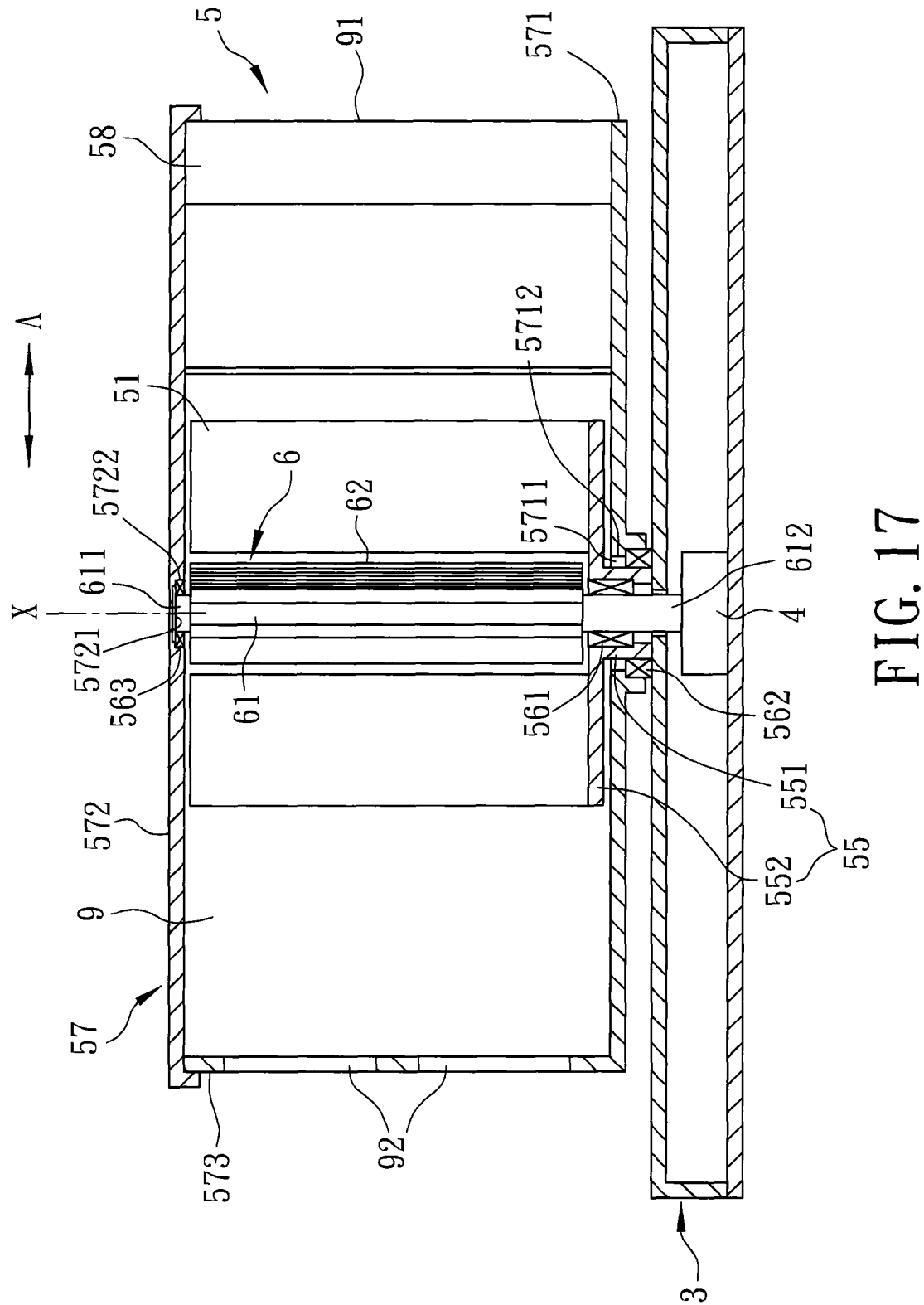
FIG. 17 is a schematic sectional view showing the fourth preferred embodiment.

FIGS. 15 to 17 illustrate the fourth preferred embodiment of an apparatus for generating electric power using wind energy according to this invention, which is a modification of the first preferred embodiment. When compared to the first preferred embodiment, the auxiliary upright plates 52, the driving units 8, the control unit 7 and the mounting tube 31 are dispensed with. In this embodiment, the wind-collecting unit 5 includes the upright plates 51, a connecting seat 55, a first bearing 561, a wind-collecting cover 57, a second bearing 562, and a third bearing 563.

The connecting seat 55 has a tube body 551 mounted fixedly on the base 3 and permitting extension of the lower end 612 of the upright rod 61 of the blade device 6 therethrough, and a connecting plate 552 extending radially and outwardly from one end of the tube body 551, and connected fixedly to bottom ends of the upright plates 51, as best shown in FIG. 17.

The first bearing 561 is disposed between the outer annular surface of the lower end 612 of the upright rod 61 of the blade device 6 and an inner annular surface of the tube body 551.

The wind-collecting cover 57 is mounted pivotally on the tube body 551 of the connecting seat 55 for covering the blade device 6 and an assembly of the upright plates 51 and the connecting plate 552 of the connecting set 55 such that the wind-collecting cover 57 is rotatable relative to the base 3 about the pivot axis (X). In this embodiment, the wind-collecting cover 57 includes a bottom wall, a top wall, a C-shaped surrounding wall 573, and two wind-collecting plates 58. The bottom wall 571 is formed with a through hole 5711 for permitting extension of the tube body 551 of the connecting seat 55 therethrough. The through hole 5711 in the bottom wall 571 is defined by an inner annular surface 5712 of the bottom wall 571. The top wall 572 has a bottom surface formed with a positioning groove 5721 for permitting extension of the upper end 611 of the upright rod 61 of the blade device 6 thereinto. The positioning groove 5721 in the top wall 572 is defined by an inner annular surface 5722. The surrounding wall 573 extends between peripheries of the bottom and top walls 571, 572, and cooperates with the bottom and top wall 571, 572 to define an inner space 9 thereamong. The surrounding wall 573 has opposite ends 5731 defining a wind inlet 91 therebetween, and is formed with two wind outlets 92 in spatial communication with the inner space 9 and opposite to the wind inlet 91 in a direction (A) that is transverse to the pivot axis (X). The wind-collecting plates 58 extend respectively from the ends 5731 of the surrounding wall 573 into the inner space 9 such that an inwardly converging wind-guiding channel 93 is defined between the wind-guiding plates 58. In use, the wind-collecting cover 57 rotates in response to blowing of wind thereto so that the wind flows into the inner space 9 via the wind inlet 91 and out of the inner space 9 via the wind outlet 92. As a result, an orientation of the wind-collecting cover 57 is maintained so that the wind inlet 91 faces toward the wind until the wind direction changes.

The second bearing 562 is disposed between the inner annular surface 5712 of the bottom wall 571 of the wind-collecting cover 57 and an outer annular surface of the tube body 551 of the connecting seat 55.

The third bearing 563 is disposed between the inner annular surface 5722 of the top wall 572 of the wind-collecting cover 57 and the outer annular surface of the upper end 611 of the upright rod 61 of the blade device 6.

In such a configuration, first, ambient wind from different directions can be guided by the wind-collecting cover 57 through rotation to blow into the inner space 9 via the wind-guiding channel 93. Subsequently, the wind in the inner space 9 is guided by the upright plates 51 disposed adjacent to the wind-guiding channel 93 to blow toward the first side surface 621 of the blades 62 of the blade device 6 via the wind-guiding channels 50. Therefore, the apparatus of the present invention can ensure stable electric generation even though the wind direction changes.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An apparatus for generating electric power from wind energy, comprising:
   a base;
   a blade device including an upright rod extending vertically along a pivot axis and having a lower end disposed pivotally in said base, and an upper end, and at least one blade unit having a plurality of upright blades connected directly and fixedly to the upright rod such that said blade device is rotatable relative to said base about the pivot axis so as to convert wind energy into a mechanical rotary power output, each of said blades of said blade unit having opposite first and second side surfaces, and a plurality of first wind-collecting ribs extending vertically from said first side surface, spaced apart from each other such that a wind-collecting space is defined between any two adjacent ones of said first wind-collecting ribs, and having a thickness that increases gradually toward said first side surface, said first side surface of each of said blades of said blade unit facing said second side surface of an adjacent one of said blades;

a generator disposed in said base and coupled to said lower end of said upright rod of said blade device to convert the mechanical rotary power output into electric power; and a wind-collecting unit mounted on said base, and including a plurality of upright plates angularly equidistant and disposed around said blade device, any two adjacent ones of said upright plates defining an inwardly converging wind-guiding channel therebetween;

wherein said upright plates of said wind-collecting unit are non-flat so that wind is guided by said upright plates of said wind-collecting unit to blow onto said first side surfaces of said blades of said blade unit of said blade device via said wind-guiding channels in said wind-collecting unit;

wherein said wind-collecting unit further includes a plurality of auxiliary upright plates disposed movably and respectively in said upright plates, each of said auxiliary upright plates being movable relative to a corresponding one of said upright plates between a retracted position and an extended position.

2. The apparatus as claimed in claim 1, wherein each of said blades of said blade unit of said blade device further has a plurality of second wind-collecting ribs extending horizontally from said first side surface, spaced apart from each other and intersecting said first wind-collecting ribs.

3. The apparatus as claimed in claim 1, wherein said base includes a base body connected fixedly to bottom ends of said upright plates of said wind-collecting unit and receiving said generator therein, a mounting tube extending upwardly from a top side of said base body for permitting extension of said lower end of said upright rod of said blade device into said base therethrough, and a bearing disposed between an outer annular surface of said lower end of said upright rod of said blade device and an inner annular surface of said mounting tube of said base.

4. The apparatus as claimed in claim 1, wherein said wind-collecting unit further includes a top wall mounted on top ends of said upright plates and having a bottom surface formed with a positioning groove that permits extension of said upper end of said upright rod of said blade device thereinto and that is defined by an inner annular surface of said top wall, and a bearing disposed between said inner annular surface of said top wall and an outer annular surface of said upper end of said upright rod of said blade device.

5. The apparatus as claimed in claim 1, wherein said wind-collecting unit further includes a plurality of connecting units, each of which includes a plurality of connecting plates interconnecting between two corresponding adjacent upright plates.

6. The apparatus as claimed in claim 1, wherein said blade device includes a plurality of said blade units aligned in the pivot axis, said blades of each of said blade units being angularly equidistant, said blades of said blade units differing angularly from each other.

7. The apparatus as claimed in claim 1, further comprising:
a plurality of driving units for driving respectively said auxiliary upright plates to move between the retracted position and the extended position; and
a control unit coupled to said driving units and operable so as to control operation of each of said driving units.

8. The apparatus as claimed in claim 7, wherein each of said driving units includes a plurality of fluid cylinders, each of which has a cylinder body mounted fixedly in a respective one of said upright plates, and a piston rod coupled movably to said cylinder body and connected to a corresponding one of said auxiliary upright plates.

9. The apparatus as claimed in claim 1, wherein each of said upright plates of said wind-collecting unit has a first end portion adjacent to said blade device and extending in a non-radial direction, and a second end portion opposite to said first end portion, and is bent so that an obtuse angle is formed between said first and second end portions.

10. The apparatus as claimed in claim 9, wherein the obtuse angle ranges from 135° to 165°.

11. The apparatus as claimed in claim 9, wherein said first end portion of each of said upright plates of said wind-collecting unit has a thickness that decreases gradually toward said blade device.

12. The apparatus as claimed in claim 9, wherein said first end portion of each of said upright plates of said wind-collecting unit has opposite curved first and second surfaces.

13. An apparatus for generating electric power from wind energy, comprising:
a base;
a blade device including an upright rod extending vertically along a pivot axis and having a lower end disposed pivotally in said base, and an upper end, and at least one blade unit having a plurality of upright blades connected directly and fixedly to the upright rod such that said blade device is rotatable relative to said base about the pivot axis so as to convert wind energy into a mechanical rotary power output, each of said blades of said blade unit having opposite first and second side surfaces, and a plurality of first wind-collecting ribs extending vertically from said first side surface, spaced apart from each other such that a wind-collecting space is defined between any two adjacent ones of said first wind-collecting ribs, and having a thickness that increases gradually toward said first side surface, said first side surface of each of said blades of said blade unit facing said second side surface of an adjacent one of said blades;

a generator disposed in said base and coupled to said lower end of said upright rod of said blade device to convert the mechanical rotary power output into electric power; and a wind-collecting unit mounted on said base, and including a plurality of upright plates angularly equidistant and disposed around said blade device, any two adjacent ones of said upright plates defining an inwardly converging wind-guiding channel therebetween;

wherein said upright plates of said wind-collecting unit are non-flat so that wind is guided by said upright plates of said wind-collecting unit to blow onto said first side surfaces of said blades of said blade unit of said blade device via said wind-guiding channels in said wind-collecting unit, wherein said upright rod of said blade device further has a tubular intermediate portion interconnecting said upper and lower ends and having an annular wall that is connected with said blades of said blade unit and is formed with a plurality of openings, said blade device further including a wind-guiding unit disposed in said intermediate portion of said upright rod for guiding wind flowing into said intermediate portion of said upright rod via the openings to blow toward said first side surfaces of said blades of said blade unit, said wind-guiding unit including an axial rod extending along the pivot axis, and having opposite ends connected pivotally and respectively to said upper and lower ends of said upright rod, and upright first and second wind-guiding plates extending radially from said axial rod, said first wind-guiding plate having a width larger than that of said second wind-guiding plate.

14. An apparatus for generating electric power from wind energy, comprising:

a base;

a blade device including an upright rod extending vertically along a pivot axis and having a lower end disposed pivotally in said base, and an upper end, and at least one blade unit having a plurality of upright blades connected directly and fixedly to the upright rod such that said blade device is rotatable relative to said base about the pivot axis so as to convert wind energy into a mechanical rotary power output, each of said blades of said blade unit having opposite first and second side surfaces, and a plurality of first wind-collecting ribs extending vertically from said first side surface, spaced apart from each other such that a wind-collecting space is defined between any two adjacent ones of said first wind-collecting ribs, and having a thickness that increases gradually toward said first side surface, said first side surface of each of said blades of said blade unit facing said second side surface of an adjacent one of said blades;

a generator disposed in said base and coupled to said lower end of said upright rod of said blade device to convert the mechanical rotary power output into electric power; and a wind-collecting unit mounted on said base, and including a plurality of upright plates angularly equidistant and disposed around said blade device, any two adjacent ones of said upright plates defining an inwardly converging wind-guiding channel therebetween;

wherein said upright plates of said wind-collecting unit are non-flat so that wind is guided by said upright plates of said wind-collecting unit to blow onto said first side surfaces of said blades of said blade unit of said blade device via said wind-guiding channels in said wind-collecting unit, wherein said wind-collecting unit further includes:

a connecting seat having a tube body mounted fixedly on said base and permitting extension of said lower end of said upright rod of said blade device therethrough, and a connecting plate extending radially and outwardly from one end of said tube body, and connected fixedly to bottom ends of said upright plates;

a first bearing disposed between an outer annular surface of said lower end of said upright rod of said blade device and an inner annular surface of said tube body;

a wind-collecting cover mounted pivotally on said tube body of said connecting seat for covering said blade device and an assembly of said upright plates and said connecting plate of said connecting seat such that said wind-collecting cover is rotatable relative to said base about the pivot axis, said wind-collecting cover including a bottom wall formed with a through hole for permitting extension of said tube body of said connecting seat therethrough, said through hole in said bottom wall being defined by an inner annular surface of said bottom wall, a top wall having a bottom surface formed with a positioning groove for permitting extension of said upper end of said upright rod of said blade device thereinto, said positioning groove in said top wall being defined by an inner annular surface of said top wall, a C-shaped surrounding wall extending between peripheries of said bottom and top walls and cooperating with said bottom and top walls to define an inner space thereamong, said surrounding wall having opposite ends defining a wind inlet therebetween in spatial communication with said inner space, and being formed with at least one wind outlet in spatial communication with said inner space and opposite to said wind inlet in a direction that is transverse to the pivot axis, and two wind-guiding plates extending respectively from said ends of said surrounding wall into said inner space such that an inwardly converging wind-guiding channel is defined between said wind-guiding plates, wherein said wind-collecting cover rotates in response to blowing of wind thereto so that the wind flows into said inner space via said wind inlet and out of said inner space via said wind outlet;

a second bearing disposed between said inner annular surface of said bottom wall of said wind-collecting cover and an outer annular surface of said tube body of said connecting seat; and a third bearing disposed between said inner annular surface of said top wall of said wind-collecting cover and an outer annular surface of said upper end of said upright rod of said blade device.

* * * * *